United States Patent
Kanaujia et al.

(10) Patent No.: US 9,449,432 B2
(45) Date of Patent: Sep. 20, 2016

(54) SYSTEM AND METHOD FOR IDENTIFYING FACES IN UNCONSTRAINED MEDIA

(71) Applicant: AVIGILON FORTRESS CORPORATION, Vancouver (CA)

(72) Inventors: Atul Kanaujia, Herndon, VA (US); Narayanan Ramanathan, Chantilly, VA (US); Tae Eun Choe, Reston, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 22 days.

(21) Appl. No.: 14/576,818

(22) Filed: Dec. 19, 2014

(65) Prior Publication Data

US 2015/0178554 A1    Jun. 25, 2015

Related U.S. Application Data

(60) Provisional application No. 61/918,205, filed on Dec. 19, 2013, provisional application No. 61/968,015, filed on Mar. 20, 2014.

(51) Int. Cl.
*G06K 9/00* (2006.01)
*G06T 19/20* (2011.01)

(52) U.S. Cl.
CPC .......... *G06T 19/20* (2013.01); *G06K 9/00268* (2013.01); *G06K 2009/00322* (2013.01)

(58) Field of Classification Search
CPC ............... G06K 2009/00322; G06K 9/00268; G06T 19/20
USPC ........................................................ 382/118
See application file for complete search history.

(56) References Cited

U.S. PATENT DOCUMENTS

| | | | |
|---|---|---|---|
| 2004/0017933 A1 | 1/2004 | Lestideau | |
| 2005/0238210 A1 | 10/2005 | Sim | |
| 2006/0067573 A1* | 3/2006 | Parr | G06K 9/00275 382/154 |
| 2009/0310828 A1 | 12/2009 | Kakadiaris et al. | |
| 2010/0172567 A1* | 7/2010 | Prokoski | A61B 5/0064 382/132 |
| 2010/0189342 A1 | 7/2010 | Parr et al. | |
| 2011/0091080 A1 | 4/2011 | Gamliel et al. | |

OTHER PUBLICATIONS

International Search Report and Written Opinion dated Apr. 13, 2015 issued in International Application No. PCT/US2014/071548, pp. 1-9.

* cited by examiner

*Primary Examiner* — Manuchehr Rahmjoo
(74) *Attorney, Agent, or Firm* — MH2 Technology Law Group, LLP

(57) ABSTRACT

Methods and systems for facial recognition are provided. The method includes determining a three-dimensional (3D) model of a face of an individual based on different images of the individual. The method also includes extracting two-dimensional (2D) patches from the 3D model. Further, the method includes generating a plurality of signatures of the face using different combinations of the 2D patches, wherein the plurality of signatures correspond to respective views of the 3D model from different angles.

26 Claims, 6 Drawing Sheets

SYSTEM AND METHOD FOR IDENTIFYING FACES IN UNCONSTRAINED MEDIA

RELATED APPLICATIONS

This application claims benefit of prior provisional Application No. 61/918,205, filed Dec. 19, 2013, and prior provisional Application No. 61/968,015, filed Mar. 20, 2014, the entire disclosures of which are incorporated herein by reference.

FIELD

This disclosure relates to systems and methods recognizing images in media, and more specifically, to facial recognition.

BACKGROUND

Cameras have become common in mobile devices, surveillance sensors, and law enforcement vehicles. Due to their mobility, such cameras can record images of individuals in a variety of unconstrained conditions. That is, in contrast to a staged mug shot, faces of individuals recorded under unconstrained conditions can vary greatly due to changes in lighting (e.g., natural and artificial), attributes of the individual's face (e.g., age, facial hair, glasses), viewing angle (e.g., pitch and yaw), occlusions (e.g., signs, trees, etc.), and the like. For example, a wrongdoer may perform an illegal act at a crowded event. Around a time of the act, bystanders may capture images of the wrongdoer while recording the event using their mobile cameras. Additionally, security cameras monitoring the event may capture images of the wrongdoer from different (e.g., elevated) perspectives. Coincidentally, the images of the wrongdoer may have been captured by a number of cameras having different perspectives and occlusions. The recordings may be accessed by law enforcement authorities from operators of the cameras, social networking websites, and media outlets. However, attempting to identify the wrongdoer from the various recordings can require sifting through an enormous amount of image data.

SUMMARY

The present disclosure provides a method including determining a three-dimensional (3D) model of a face of an individual based different images of the individual. The method also includes extracting two-dimensional (2D) patches from the 3D model. Further, the method includes generating a plurality of signatures of the face using different combinations of the 2D patches, wherein the plurality of signatures correspond to respective views of the 3D model from different angles.

Additionally, the present disclosure provides a facial recognition system, including a processor, a storage system, program instructions stored on the computer-readable hardware storage device for execution by the processor. The program instructions include program instructions that determine a three-dimensional (3D) model of a face of an individual based on different images of the individual. The program instructions also include program instructions that extract two-dimensional (2D) patches from the 3D model. Further, the program instructions include program instructions that generate a plurality of signatures of the face using different combinations of the 2D patches, wherein the plurality of signatures correspond to respective views of the 3D model from different angles.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
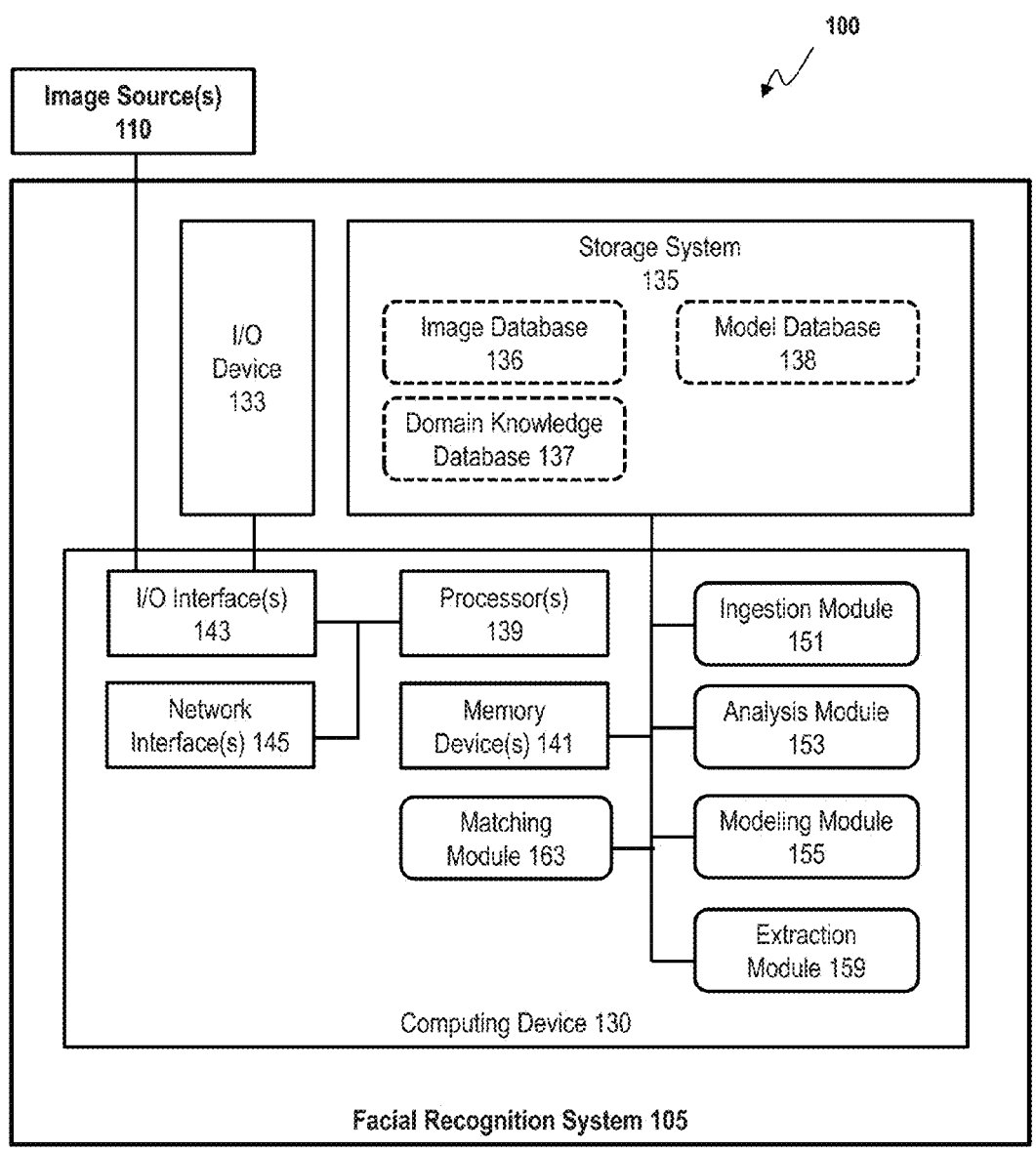
FIG. 1 illustrates a block diagram of an exemplary environment for implementing systems and processes in accordance with aspects of the present disclosure.

It should be noted that some details of the figures have been simplified and are drawn to facilitate understanding of the present teachings, rather than to maintain strict structural accuracy, detail, and scale.

DETAILED DESCRIPTION

This disclosure relates to systems and methods for recognizing images in media, and more specifically, to facial recognition. In accordance with aspects of the present disclosure, the system and method can be used to recognize an individual in images based on an attribute-based representation of the individual's face. The attribute-based representation comprises multi-view probabilistic elastic parts ("multi-view PEP") signatures determined using 2D patches extracted from the images and attributes that semantically characterize the individual's face (e.g., gender, age, ethnicity, etc.). The multi-view PEP signatures are determined using attribute-specific PEP models built from 2D face patches extracted from a 3D model. A PEP model is a local spatial-appearance feature based Gaussian mixture model. The 3D model is constructed from different poses of the face obtained from images of the individual in photographs, videos, and/or sketches. Advantageously, the attribute-based representation accounts for geometric, structural and photometric variability occurring in the individual's face due to viewpoint, illumination, aging, and expressions, while preserving invariant features that can be used to uniquely discriminate the individual's face from others.

In accordance with aspects of the invention, the attribute-based representation normalizes characterizations (e.g., aging, pose, illumination and expressions) of the face upon which it is based. The attribute-based representation and the characteristics can be interdependent, wherein parameters of the attribute-based representation strongly influence the models used for normalization and vice-versa. The attribute-based representation is, therefore, determined by iteratively optimizing it over sets of parameters corresponding to sub-representations.

Further, in accordance with aspects of the invention, the two components of attribute-based representation (multi-view PEP signatures and attributes) encode information at different levels of abstraction. The 3D model, upon which the multi-view PEP signatures are based, is normalized to overcome limitations of 2D image based PEP representations by modeling extreme variations for which insufficient training examples are available and accurate statistical models cannot be learned to account for variations. Furthermore, the domain knowledge used for constructing each components of the attribute-based representation is independently extracted from varied sources and enforced as complementary prior constraints in the attribute-based representation.

The attribute-based representation of the present disclosure provides many advantages. Firstly, the PEP models used to create the multi-view PEP signatures provide pose invariance. Secondly, because PEP models implicitly identify "non-face" patches, the multi-view PEP signatures account for face variations, such as occlusions and low-resolution data, that cannot be directly modeled. Thirdly, the multi-view PEP signatures can assimilate infrared and/or heterogeneous data by using a model that supports non-visual media (e.g., near-infrared, composite sketches, etc.). Fourthly, the multi-view PEP signatures can be extended to all age groups using statistically learned regression functions for image features. Fifthly, the multi-view PEP signature provides resilience to changes in illumination and expression. That is, variations due to illumination and expression are removed by face relighting and expression neutralization when determining the multi-view PEP signatures. In accordance with aspects of the present disclosure, 2D image patches extracted from the multi-view PEP are devoid of such variations because any patches having poor illumination (shadows or saturation) and those that correspond to strong facial expressions are weighed down in multi-view PEP signatures.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is an exemplary environment 100 for implementing methods and systems in accordance with aspects of the present disclosure. The environment 100 includes a facial recognition system 105 and an image source 110. In accordance with aspects of the present disclosure, the facial recognition system 105 is a system that ingests (e.g., obtains) various media (e.g., still pictures, motion pictures, videos, drawings, etc.) including images of an individual and generates a model (e.g., a PEP model) of an individual's face for facial recognition. The system extracts information from the model and uses the extracted information to recognize the individual in other media. The image source 110 is a device or system that captures and/or stores images data, such as video, photographs, pictures, etc. In embodiments, the image source 110 is a media database. Additionally or alternatively, the image source 110 is one or more of image sensors (e.g., a camera).

In accordance with aspects of the present disclosure, the facial recognition system 105 includes hardware and software that perform the processes and functions described herein. In particular, the facial recognition system 105 includes a computing device 130, an input/output (I/O) device 133, a storage system 135, and a device selector 137. The I/O device 133 can include any device that enables an individual to interact with the computing device 130 (e.g., a user interface) and/or any device that enables the computing device 130 to communicate with one or more other computing devices using any type of communications link. The I/O device 133 can be, for example, a handheld device, PDA, touchscreen display, handset, keyboard, etc.

The storage system 135 can comprise a computer-readable, non-volatile hardware storage device that stores information and program instructions. For example, the storage system 135 can be one or more flash drives and/or hard disk drives. In accordance with aspects of the present disclosure, the storage device 135 includes an image database 136, a domain knowledge database 137, and a model database 138. The image database 136 can store images and media obtained from the image source 110. The domain knowledge database 137 includes a collection of predetermined models and anthropometric information that can applied for extracting semantic information from media (e.g., gender, ethnicity, age, face shape, skin type, facial features, etc.) and for modeling a face (e.g., shapes, features, proportions, musculature, and textures corresponding to different genders, ethnicities, and ages). The model database 138 includes 3D face models of individuals, 2D patches extracted form the 3D face models, and extracted attributes that comprise an attribute-based representation.

In embodiments, the computing device 130 includes one or more processors 139, one or more memory devices 141 (e.g., RAM and ROM), one or more I/O interfaces 143, and one or more network interfaces 144. The memory device 141 can include a local memory (e.g., a random access memory and a cache memory) employed during execution of program instructions. Additionally, the computing device 130 includes at least one communication channel (e.g., a data bus) by which it communicates with the I/O device 133, the storage system 135, and the device selector 137. The processor 139 executes computer program instructions (e.g., an operating system and/or application programs), which can be stored in the memory device 141 and/or storage system 135.

Moreover, in accordance with aspects of the present disclosure, the processor 139 can execute computer program instructions of an ingestion module 151, an analysis module 153, a modeling module 155, an extraction module 159, and a matching module 163 to perform one or more of the processes described herein. The ingestion module 151, the analysis module 153, the modeling module 155, and the extraction module 159, and the matching module 163 can be implemented as one or more sets of program instructions in the memory device 141 and/or the storage system 135 as separate or combined modules. Additionally, the ingestion module 151, the analysis module 153, the modeling module 155, and the extraction module 159, and the matching module 163 can be implemented as separate dedicated processors or a single or several processors to provide the function of these modules.

In accordance with embodiments of the disclosure, the ingestion module 151 causes the computing device 130 to obtain media from the image source 110 and improve images included in the media (e.g., improve resolution, blurring, and contrast). Additionally, the ingestion module 151 causes the computing device to detect and track faces in the images (e.g., using face and eye detecting algorithms).

The analysis module 153 causes the computing device 130 extract attributes from the faces detected by ingestion module 151. The attributes semantically describe characteristics of the faces. In embodiments, the attributes are derived characteristics associated with individuals' gender, age, ethnicity, hair color, facial shape, hair color, etc. Advantageously, the attributes allow efficient indexing and retrieval from multi-view PEP signatures by providing a flexible, domain-adaptive vocabulary for describing an individual's appearance, thereby reducing search time and data storage requirements.

The modeling module 155 causes the computing device 130 to create or determine a 3D model of an individual's face. In accordance with aspects of the present disclosure, the 3D model is a pose-aware probabilistic elastic part-based (PEP) model generated for all variations of a 3D pose (e.g., a quantized space of yaw and pitch) that compactly encodes shape, texture and dynamics of the face appearing in a wide range of media modalities and under varied viewing and lighting conditions. Additionally, in accordance with aspects of the present disclosure, the modeling module 155 can relight the 3D model, neutralize a facial expression captured in the 3D model, modify the age of the individual represented by the 3D model, and account for facial decorations and occlusions associated with the 3D model. Further, the modeling module can use the domain knowledge (e.g., in domain knowledge database 137) to fill in information missing from the 3D model (e.g., skin texture and occluded patches).

The extraction model 159 causes the computer device to generate multi-view PEP face signatures using 2D patches, and semantic attributes that characterize various demographic groups (e.g., ethnicity, gender, age-group, etc.). In accordance with aspects of the present disclosure, the extraction model determines the 2D patches from projections from the 3D model from multiple poses. The poses can be within a number of predefined viewing-angle ranges having a pitch (e.g., −10 degrees to +10 degrees) and a yaw (e.g., −10 degrees to +10 degrees) with respect to the a direct view (e.g., a pitch of zero and a yaw of zero from the frontal view) of the 3D model. The projections are combined to provide the multi-view PEP signatures from dense overlapping 2D face patches corresponding to the poses. In other words, the amount of data includes in each of the multi-view PEP face signatures does not change with the quality and/or quantity of available media. Accordingly, the multi-view PEP face signatures can be incrementally refined by incorporating information from additional images without increasing the size of the representation.

Additionally, in accordance with aspects of the present disclosure, the extraction module 159 determines an uncertainty metric for each of the multi-view PEP face signatures. The uncertainty metric characterizes the quality of the 2D patches within each of the multi-view PEP face signatures. The extraction module 159 determines the uncertainty metric is computed using "face-like" measures that can be derived from the 3D model. For example, the metric can correspond to a percentage of the patches corresponding to a particular multi-view PEP face signature that includes a non-face part.

Further, in accordance with aspects of the present disclosure, the multi-view PEP face signatures are adaptive to the resolution of the available images. In embodiments, the multi-view PEP face signatures are automatically adjusted to the available resolution on a face image. As such, the greater the available resolution, the more detailed the face representation will be; and the lower the resolution, the less detailed the face representation will be.

Moreover, in accordance with aspects of the present disclosure, the extraction module 159 associates each of the multi-view PEP face signatures with one or more of the attributes. In embodiments, the extraction module 159 appends one or more face-attributes (e.g., ethnicity, age, gender, unique aspects of the face such as ovalness, roundness etc.) to respective multi-view PEP face signatures. Thus, the attribute-based representation of the present disclosure enables efficient indexing and retrieval of faces using the associated attributes.

The matching module 163 causes the computing device to determine whether face image matches that of an individual based on the attribute-based representation of an individual's face determined by the modeling module 155. In accordance with aspects of the present disclosure, the matching is based on an uncertainty metric determined for each components of the multi-view probabilistic elastic parts ("multi-view PEP") signature. Additionally, in accordance with aspects of the present disclosure, the matching module 163 uses domain adaptation to match the multi-view PEP face signatures across imaging modalities. In embodiments, the modalities include RGI spectrum, infrared, hyperspectral, and drawings (e.g., sketches and cartoons), among others.

In embodiments, the domain knowledge database 137 can include the following information that can be referenced by the facial recognition system 105: facial anthropometry, face super-resolution tools, attribute specific 3D shape model, attribute specific multi-view PEP, attributes extraction tools, feature selection priors, facial action unit coding system, and domain adaptation tools. Facial anthropometry is statistics (mean and standard deviation) of anthropometric measurements that characterizes demographic facial information and identify invariant facial features across structural changes due to aging and expressions. Anthropometric measurements estimated from a 3D face model can be used when determining a matching score by the matching module 155, as well as for determining attributes by the analysis module 153. The face super-resolution tools are component-based matching to exemplar images for enhancing pixel level details of the face image. The face super-resolution tools provide improved facial features extraction for building representations by the modeling module 155. The attribute specific 3D shape model is different subspaces modeling modes of variation of 3D face shapes based on ethnicity, gender and age. These provide more informative priors for fitting a 3D shape compared to generic 3D face shapes by the modeling module 155. The attribute-specific multi-view PEP are Gaussian Mixture Model (GMM) of patches densely sampled from the images of individuals with a common attribute (e.g., gender, ethnicity and age group). These provide personalized statistical models used for matching by the matching module 163. The attributes extraction tools are discriminative models (based on deep learning and structured prediction) for detecting attributes from face images by the analysis module 153. The attributes extraction tools model uncertainty of these attributes, which allows for matching along meaningful aspects of the face. The feature selection priors are deep learning based feature selection for achieving invariance differences in facial features due to, for example, aging, pose and illumination changes, and enhanced part-based representation and matching. These allow for faster feature extraction by the extraction module 159 for determining relevant and greatest discriminative features. The facial action unit coding system is universally applicable, intermediate representations of facial musculature dynamics for modeling facial deformations due to expressions by the modeling module 155. The facial action unit coding system provides explicit and accurate modeling of facial musculature. The domain adaptation tools are learned tools that model domain shift across aging, pose and illumination changes.

It is noted that the computing device 130 can comprise any general purpose computing article of manufacture capable of executing computer program instructions installed thereon (e.g. a personal computer, server, etc.). However, the computing device 130 is only representative of various possible equivalent-computing devices that can perform the processes described herein. To this extent, in embodiments, the functionality provided by the computing device 130 can be any combination of general and/or specific purpose hardware and/or computer program instructions. In each embodiment, the program instructions and hardware can be created using standard programming and engineering techniques, respectively.

Figure 2:
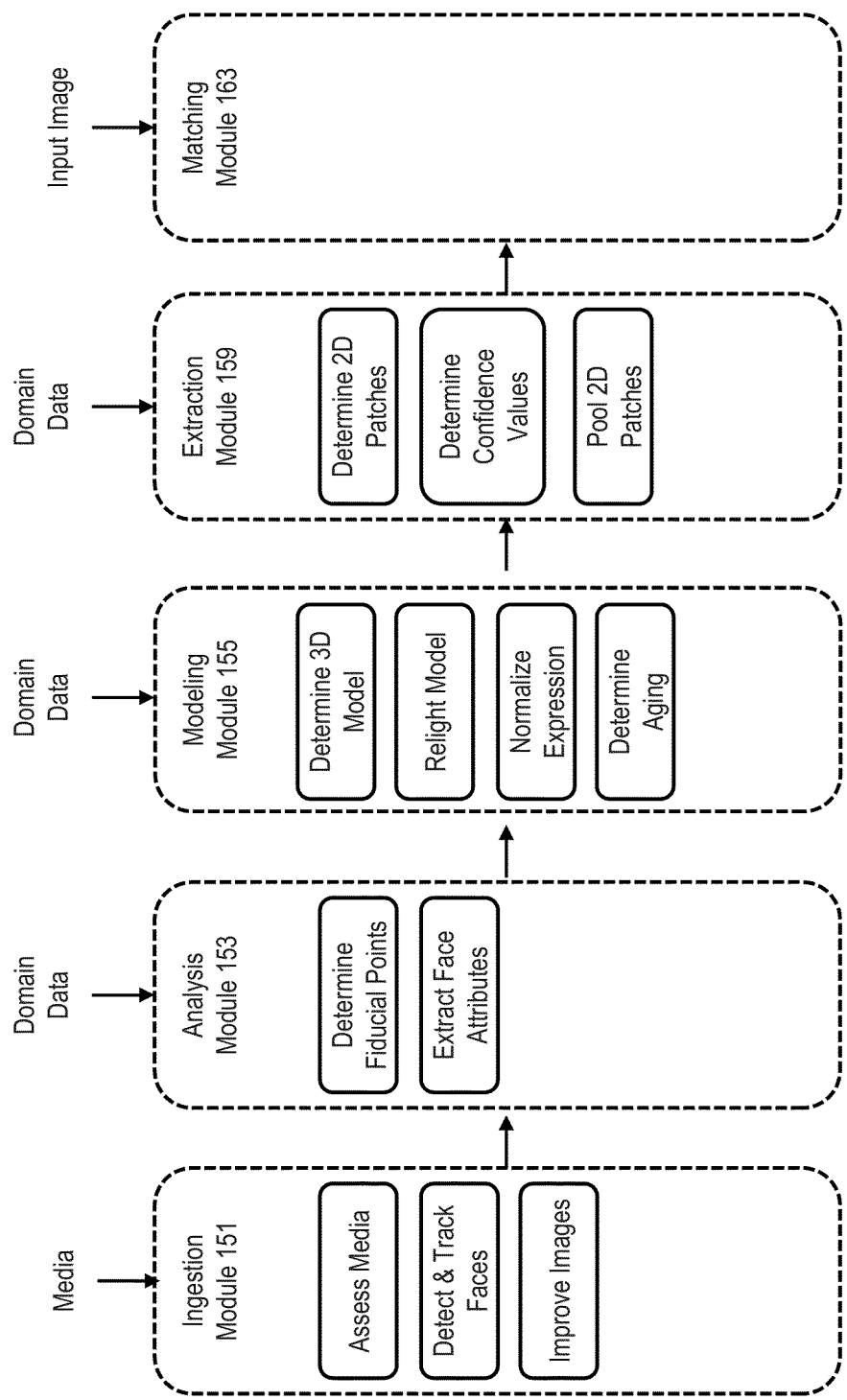
FIG. 2 illustrates a functional block diagram of an exemplary facial recognition system in accordance with aspects of the present disclosure.

FIG. 2 illustrates a functional flow diagram of an exemplary process of facial recognition system 105 in accordance with aspects of the present disclosure. The facial recognition system 105 includes ingestion module 151, analysis module 153, modeling module 155, extraction module 159, and matching module 163, which can be the same as those previously described. In accordance with aspects of the present disclosure, the ingestion module 151 assesses media received from an image source (e.g., image source 110). The media can include photographs, videos, and or drawings (e.g., sketches) of an individual. In embodiments, assessing the media includes determining information defining a scale, face coverage (e.g., the portion of the face in an image based on a pose in an image), resolution, modality (e.g., media type), and/or quality of the media including the images. The scale of face characterizes the image resolution and determines the level of details that will be extracted by the ingestion module 151. The received images and the associated assessment information can be stored in a database (e.g., image database 136) for subsequent reference and processing.

Additionally, in accordance with aspects of the present disclosure, the ingestion module 151 improves images included in the received media. In embodiments, improving the images includes reducing blurring, improving contrast, and increasing the image resolution. For example, the imaging module 151 can reduce blurring by estimating an optimal blur kernel based on exemplar structures (eyes, mouth, face contour, etc.) from large pose-variant face datasets. Blur kernel estimation involves identifying the closest exemplar to a blurred face image (e.g., in the domain knowledge database 137) and performing regularization process that takes in the gradients of the blurred face and the closest exemplar. Still further, the improving can include relighting the images by modeling illumination conditions using statistical learning and geometry. Additionally, the ingestion module 151 can increase contrast of the images by performing histogram equalization. Further, the ingestion module 151 can use face hallucination techniques to generate high-resolution imagery from low-resolution data.

In accordance with aspects of the present disclosure, the ingestion module 151 also detects and tracks faces included in the received images. In embodiments the ingestion module 151 detects eyes and mouth of a face in an image using feature localization techniques, and determines a holistic head pose estimation. For example, the ingestion module 151 can employ an Online Discriminative Feature Selection (ODFS) approach that is based on online adaptation of object appearances using a MILTrack-type algorithm and refines feature selection by maximizing the margin between the average confidences of positive samples and negative samples. The ODFS approach selects features that maximize the confidences of target samples while suppressing the confidences of background samples. It gives greater weight to the most correct positive sample and assigns a small classifier to the background samples during classifier update, thereby facilitating effective separation of the foreground target from cluttered background across changes in scale, pose, illumination and motion blur. Additionally, the ingestion module 151 can detect and track faces using unsupervised face detection adaptation methods that exploit modeling social-context within a video to further improve the accuracy of face tracking.

In accordance with aspects of the invention, the ingestion module 151 also performs facial feature localization and tracking. The feature localization can be used to estimate the pose of an individual's head in an image and, based on the pose, to determine fiducial points corresponding the locations of the eyes, mouth, and face (e.g., neckline, chin, and hairline). In embodiments, the ingestion module 151 uses a Supervised Decent Method (SDM). SDM comprises of a non-parametric shape model that does not require learning any model of shape or appearance from training data. During the training stage, SDM uses landmarks in the training images and extracts features at the landmark locations. SDM learns from training data a sequence of generic descent directions and bias terms that minimizes the mean of all Normalized Least Squares function. Advantageously, SDM-based facial feature localization and tracking is computationally very simple (4 matrix multiplications per frame) compared to other such methods, and facilitates tracking facial landmarks with large pose variations (e.g., ±60° yaw, ±90° roll, and ±30° pitch), occlusions, and drastic illumination changes.

In accordance with aspects of the present disclosure, the analysis module 153 determines attributes from faces in the images that are detected and tracked by the ingestion module 151 based on domain knowledge (e.g. domain knowledge database 137). The attributes provide an intermediate representation space for assessing similarity between faces by the matching module 163. In embodiments, whereas low-level features are strongly affected by perturbations due to photometric and geometric changes in a scene, the space of describable facial attributes provide a more generalizable metric for establishing correspondences between faces. The attributes can be determined by referencing the fiducial points in an individual's face detected by the ingestion module 151 to features included in predetermined library of domain knowledge (e.g., domain knowledge 137). The fiducial points account for variations in the individual's face that may occur due, for example, posing and aging of the face. In embodiments, feature localization is used for 3D head pose estimation and facial attributes inference. Discriminative models are used for probabilistic inference of attributes from the face images in the media. For example, learned models for detecting both coarse (e.g., gender, ethnicity and age) and fine (e.g., hair style and color, eyebrow shape, eye color and mustache) facial attributes. The analysis module 153 can store the attributes of the face can be stored in the database (e.g., image database 136) for subsequent reference and processing.

In accordance with aspects of the present disclosure, the modeling module 155 determines a 3D model from fiducial points and attributes determined by the analysis module 153. In embodiments, the 3D model encodes shape, texture and dynamics of the face appearing in a wide range of media modalities and under varied viewing and lighting conditions. The 3D model is composed of pose-aware probabilistic elastic part-based (PEP) model generated for all variations of 3D pose (quantized space of yaw and pitch) and specialized according to the demographic attributes (gender, ethnicity and age-group) extracted from the face.

In embodiments, predefined parameters map 2D images to 3D face shapes. A 3D model is first fitted with a generic 3D mesh and then iteratively refined, based on the demographic attributes (gender and ethnicity), to fit an attribute specific model. The mapping can be, for example, a look-up table including 3D shapes, rendered 2D images and corresponding camera parameters. For example, given an image at an arbitrary pose (e.g., within a range +/−70 degrees yaw, and +/−25 degrees pitch), the modeling module 155 can roughly estimate the head pose from the 2D fiducial points. The modeling module 155 can identify a 3D shape of the face to select the generic 3D model with similar fiducial features configurations is used to select an initial estimate for the 3D model (e.g., from domain knowledge database 137). Using the selected 3D model, the modeling module 155 can then use fitting algorithms (e.g., gradient descent) to refine the facial alignment and shape of the 3D face model.

Additionally, in accordance with aspects of the present disclosure, the modeling module 155 relights the 3D model. In embodiments, the modeling module 155 uses 31) face relighting algorithms to support realistic scenarios by extending training examples used for generating the linear subspace, with sufficient illumination variation so that it spans the images taken under uncontrolled illumination conditions. For example, the modeling module 155 can use an illumination database (e.g, CMU PIE database) to capture the individual's appearance under many different illumination conditions and poses.

Further, in accordance with aspects of the present disclosure, the modeling module 155 neutralizes an expression of the 3D model. In embodiments, to neutralize expressions, the modeling module 155 uses a nonlinear manifold based approach for modeling 3D facial deformations as a combination of several 1D manifolds (each representing a mode of deformation: smile, surprise, anger etc.). For example, where a neutral face is considered to be a central point in a high dimensional space, faces of the same individual with varying expressions can be assumed to be points within the neighborhood of that space. To neutralize expressions, the modeling module 155 can use a low-dimensional space that captures the implicit structural relationships between the individual points. These constitute non-linear manifolds. The coordinates on the non-linear manifold correspond to the magnitude of facial deformation along that mode, called a "level of activation". Using nonlinear manifold learning based on a computational framework that allows for structure inference from sparse data points (e.g., N-D Tensor voting), the modeling module 155 can estimates local normal and tangent spaces of the manifold at each point. The estimated tangent vectors enable the modeling module 155 to directly navigate on the non-linear manifold. For example, the modeling module 155 can use a database comprising of 3D facial scans of subjects under different facial expressions (e.g., the Bosphorus Dataset) as the training data in building the manifolds.

Moreover, the neutralizing by the modeling module 155 is also implicitly performed by determining the 3D model of the face in accordance with aspects of the present disclosure. That is, the 3D model associates every face patch with a generative probability that measures its closeness to corresponding patches from the neutral face images that the 3D model is based on. Hence, the 3D model down-weighs facial patches that are affected by facial expressions.

Also, in accordance with aspects of the present disclosure, the modeling module 155 determines aging of the individual represented by the 3D model. Aging effects can be characterized as a combination of shape (e.g., cranial growth, sagging features) and textural variations (e.g., skin wrinkles). In embodiments, the modeling module 155 extrapolates 3D shape and texture model to account for aging. For example, the modeling module 155 can determine PEP models for different age groups (e.g., teenage (<20), young adult (20 to 35 yrs), middle-aged adult (35 to 50 yrs), and senior adult (50 and above)). The age-group based PEP models provide a unified framework to characterize patch-based appearance variations across age groups. In embodiments, the modeling module 155 limits the learning of age-group based PEP models to frontal pose bin, using frontal face images of subjects belonging to that age-group due to lack of sufficient face aging datasets across pose.

Notably, in accordance with aspects of the present disclosure, the 3D model determined by the modeling module 155 accounts for facial decorations and occlusions. The facial decoration and occlusion are implicitly removed under the attribute-based face representation. That is, the 3D model is built using faces with no facial decorations and occlusion. The patches selected based on high probabilities of the components in the model are therefore those without the facial hair and with appearance similar to the appearance of the training example patches. For example, in determining the 31) model, the modeling module 155 uses skin texture modeling to selectively extract 2D skin patches from an image and update the holistic skin texture of a 3D mesh. Thus, the skin of the 3D model lacks facial hair. Instead, the attributes for the individual determined by the analysis module 152 characterizes the presence of the facial hair, which can be used to characterize the 3D model.

In accordance with aspects of the present disclosure, the extraction module 159 extracts 2D patches from the 3D model that correspond to different ranges of poses. In embodiments, the extraction module 159 densely samples 2D patches from images rendered for each of a number of pose-bins. The 2D patches can have varying sizes (e.g., resolutions). For example, the extraction module 159 can extract 2D patches at a number of sizes levels (e.g., 10), wherein each size level is progressively smaller (e.g., 80%) at each level. Further, for each level, the extraction module 159 resolution, the extract 2D patches would be sample the face image in a step-wise fashion (e.g., each step is one-half of the 2D patch width). Depending on how the pose-bins are populated (e.g., using patches from observed image, patches extrapolated using regression or patches rendered from the normalized 3D model), different uncertainty metrics are associated to them based on the quantity and/or quantity of the respective data used to determine the 2D patches.

In accordance with aspects of the present disclosure, the matching module 163 determines matches between an input image (e.g. an image captured of a wrongdoer at an event) and of the 2D patches extracted by the extraction module 159. Similarity between the input image and the gallery media is computed as matching scores between the heterogeneous signatures of their representations. In embodiments, the matching module 163 uses a combination of indexing and matching scheme to match multi-view PEP signatures and account for the uncertainties of each of the components. In accordance with aspects of the present disclosure, visual attributes to describe a face provide an intermediate representation space for assessing similarity between faces. Whereas low-level features are strongly affected by perturbations due to photometric and geometric changes in the scene, the space of describable facial attributes provide a more generalizable metric for establishing correspondences between faces.

The flow diagrams in FIGS. 3-6 illustrate functionality and operation of possible implementations of systems, devices, methods, and computer program products according to various embodiments of the present disclosure. Each block in the flow diagrams of FIGS. 3-6 can represent a module, segment, or portion of program instructions, which includes one or more computer executable instructions for implementing the illustrated functions and operations. In some alternative implementations, the functions and/or operations illustrated in a particular block of the flow diagrams can occur out of the order shown in FIGS. 3-6. For example, two blocks shown in succession can be executed substantially concurrently, or the blocks can sometimes be executed in the reverse order, depending upon the functionality involved. It will also be noted that each block of the flow diagrams and combinations of blocks in the block can be implemented by special purpose hardware-based systems that perform the specified functions or acts, or combinations of special purpose hardware and computer instructions.

Figure 3:
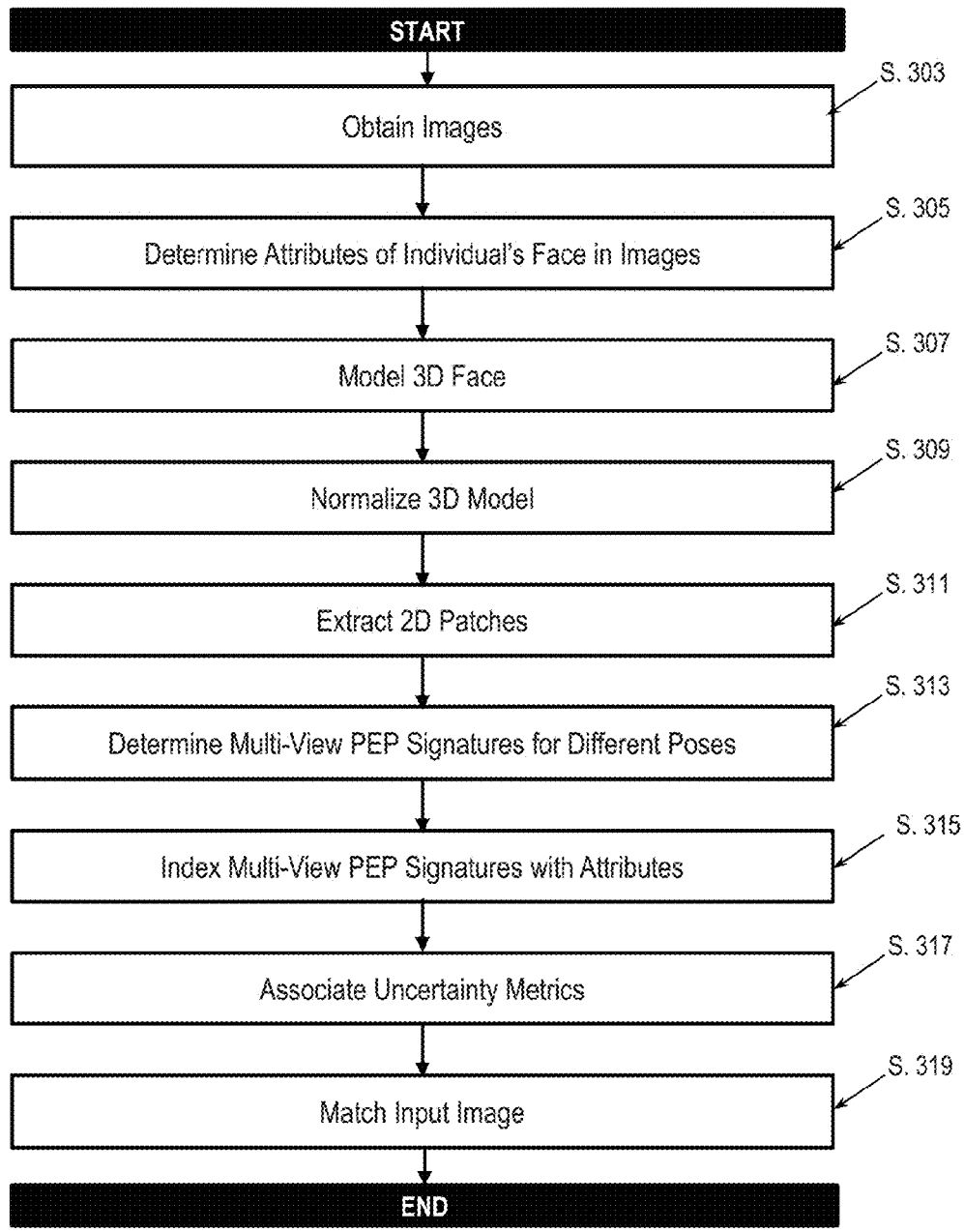
FIG. 3 illustrates a flow diagram of an exemplary process for recognizing faces in accordance with aspects of the present disclosure.

FIG. 3 illustrates a flow diagram of an exemplary process 300 for ingesting, modeling, extracting and matching images in accordance with aspects of the present disclosure. The steps of FIG. 3 can be implemented using the facial recognition system (e.g., facial recognition system 105) of FIG. 1 to obtain images from, for example, an image source (e.g., image source 110), and to process the obtained images to perform facial recognition.

At step 303, the facial recognition system (e.g., via ingestion module 151) obtains one or more images of an individual. For example, the facial recognition system can obtain an number of different images including an images of an individual's face from image sources (e.g., image source 110), such as a camera and/or an image database. The images can be stored in a database (e.g., image database 136) for reference and processing by the facial recognition system.

At step 305, the facial recognition system (e.g., via analysis module 153) determines attributes from the images. In accordance with aspects of the invention, the attributes semantically describe characteristics of the subject. In embodiments, the attributes are determined based on predefined information and models (e.g., domain knowledge database 137).

At step 307, the facial recognition system (e.g. via modeling module 155) determines a 3D model of the individual's face using the images. For example, the modeling module 155 may select a 3D mesh from a library (e.g., domain knowledge database 137) based on the attributes determined at step 305 and populate the mesh with patches of the images obtained in step 303. In embodiments, the facial recognition system can identify elements of the 3D model lacking information from the plurality of images. If the 3D model lacks any of the elements, the facial recognition tool can provide the information for the identified elements using domain knowledge (e.g., domain knowledge database 137) compiled from individuals having attributes that are similar to the attributes of the subject or target individual.

At step 309, the facial recognition system (e.g., via modeling module 155) normalizes the 3D model determined at step 307. Normalizing can include relighting the 3D model to normalize lighting variations in the face represented by the 3D model. Additionally, the normalizing can include neutralizing an expression of the face represented by the 3D model, modifying an ages of the face represented by the 3D model, and accounting for facial decorations and occlusions associated with the 3D model, as previously described herein.

At step 311, the facial recognition system via extraction module 159) extracts 2D patches from the 3D model normalized in step 309 corresponding to different poses of the face. For example, each of the different poses can correspond to respective viewing angles ranges of the 3D model. For each viewing angle range, the facial recognition system can determines a number of visible patches and store information of the patches in a database (e.g., in model database 138) in association with the respective viewing angle ranges.

At step 313, the facial recognition system (e.g., via extraction module 159) determines multi-view PEP signatures for the different poses used in step 311. In embodiments, the multi-view PEP signatures correspond to respective viewing angle ranges of the 3D model from different angles. In embodiments, the facial recognition system iteratively refines the multi-view PEP signatures using a number of additional face images. However, in accordance with aspects of the invention, each of the multi-view PEP signatures has a fixed size irrespective of the number additional face images. Also, in accordance with aspects of the invention, the facial recognition system determines one of the multi-view PEP signatures corresponding to a portion of the face having a greatest discriminative feature with respect to other features of the face. In embodiments, the determination of the portion of the face having a greatest discriminative feature is made using a convolutional neural network that trained with data to perform facial feature selection. For example, based on training data, the convolutional neural network can be used to determine an uncertainty metric for each portion and select a corresponding portion of the faces having the smallest uncertainty metric.

At step 315, the facial recognition system (e.g., via extraction module 159) indexes the multi-view PEP signatures with the attribute determined in step 305. In embodiments, for a particular multi-view PEP signature the attribute can be indexed by converting it to a vector that is treated as a component multi-view PEP signature. For example, the indexing can be performed using an Optimized Transform Coding method.

At step 317, the facial recognition system (e.g., via extraction module 159) associates one or more uncertainty metrics with each of the multi-view PEP signatures. The uncertainty metrics can be values determined based on the quality of the information used to generate each of the multi-view PEP signatures (e.g., due to occlusions, facial decorations, lightings, and viewing angle). The multi-view PEP signatures can be stored in a database (e.g., model database 138) in association with their respective attributes determined at step 315 and the respective uncertainty metrics determined at step 317.

At step 319, the facial recognition system (e.g., via matching module 163) determines whether an input image matches a face of an individual that has been modelled based on the attributes determined in step 305, the multi-view PEP signatures determined in step 315, and the uncertainty metrics determined at step 317. In embodiments, the determination includes modifying a resolution of the plurality of signatures based on a resolution of the input image. Additionally, in embodiments, the determination includes performing the matching using a plurality of imaging modalities. For example, the matching may be performed using PEP signatures corresponding to visible spectrum images, infrared images, and/or drawings.

Figure 4:
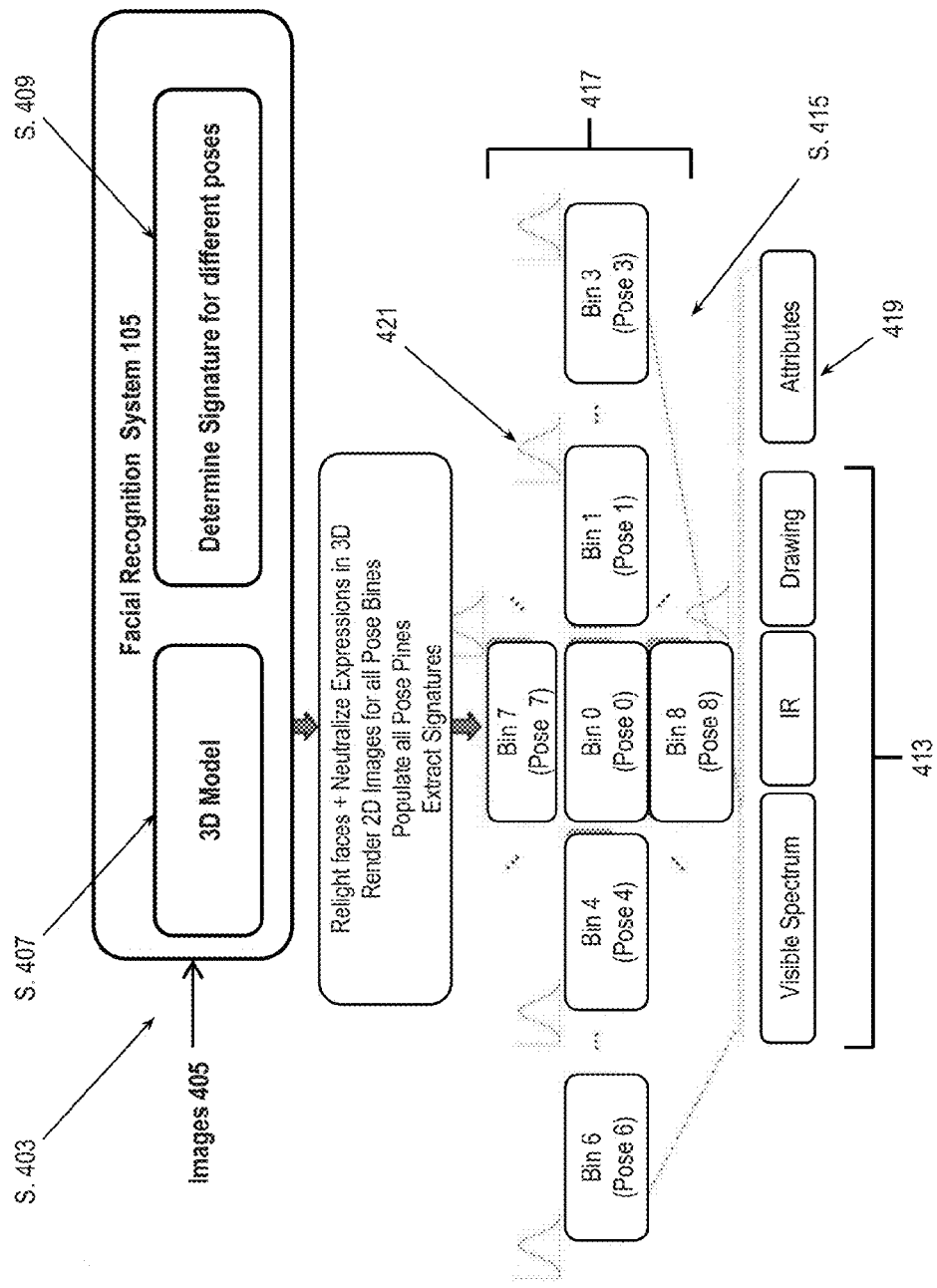
FIG. 4 illustrates a flow diagram of an exemplary process for determining an attribute-based representation using a facial recognition system in accordance with aspects of the present disclosure.

FIG. 4 illustrates a flow diagram for determining an attribute-based representation using a facial recognition system (e.g., facial recognition system 105) in accordance with aspects of the present disclosure. The facial recognition system can be the same as that previously described herein. At step 403, the facial recognition system receives one or more images 405 of an individual from one or more sources (e.g., image source 110). At step 407, the facial recognition system (e.g., using modeling module 155) determines a 3D model of the individual's face. The 3D model can be based on a standard shape that is selected based on attributes of the individual (e.g., gender, age, ethnicity, etc.) that are extracted from the received images (e.g., using analysis module 153). Further, the facial recognition system can modify the representation of the individual's face in the 3D module by relighting the model, normalizing a facial expression, and/or aging the face, as previously described herein.

At step 409, the facial recognition system 105 (e.g., using extraction module 159) determines multi-view PEP signatures from the 3D model determined at step 407 by extracting 2D patches corresponding to a number of different poses of the 3D model. Each of the poses can correspond to a viewing angle of the 3D model based on a different combination of pitch and yaw ranges. For example, a first combination can include a pitch range of −15 degrees to 15 degrees and a yaw range of 10 degrees to 40 degrees; a second combination can include a pitch range of −10 degrees to +10 degrees and a yaw range of −90 degrees to −75 degrees; a third combination can include a pitch range of −10 degrees to +10 degrees and a yaw range of −45 degrees to −15 degrees; a fourth combination can include a pitch range of −10 degrees to +10 degrees and a yaw range of −15 degrees to +15 degrees; a fifth combination can include a pitch range of −10 degrees to +10 degrees and a yaw range of +15 degrees to +45 degrees; a sixth combination can include a pitch range of −10 degrees to +10 degrees and a yaw range of +75 degrees to +90 degrees; and a seventh combination can include a pitch range of −40 degrees to −10 degrees and a yaw range of −15 degrees to +15 degrees. In accordance with aspects of the present disclosure, the multi-view PEP signatures are determined for a plurality of image modalities 413 (e.g., visible spectrum, infrared, and sketch/cartoon)

At step 415, the facial recognition system (e.g. using extraction model 159) populates a plurality of bins 417 (e.g., bins 0-8) corresponding, respectively, to each of the multi-view PEP signatures determined for the different poses (e.g., poses 0-8) used in step 409. Additionally, each of the bins 417 is indexed by one or more attributes 419. Further, each of the bins 417 is associated with a respective uncertainty metric 421. In accordance with aspects of the present disclosure, an individual can be identified based the similarity between an image of the individual and the multi-view PEP signatures determined for the different poses.

Figure 5:
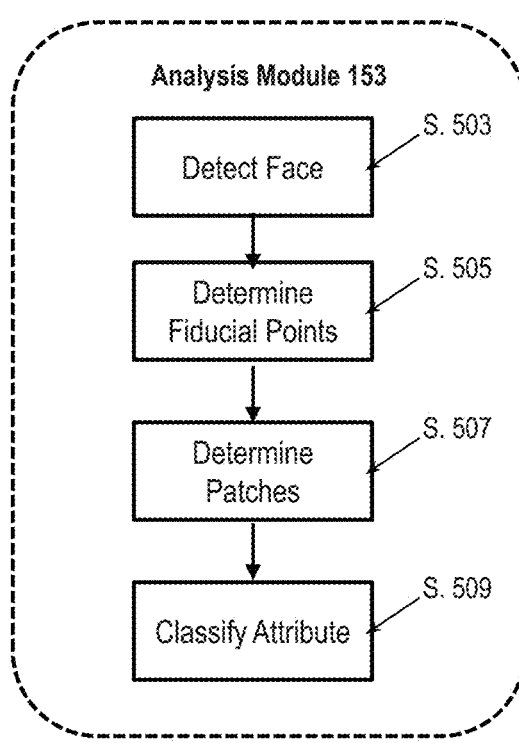
FIG. 5 illustrates a flow diagram of an exemplary process for determining attributes using a facial recognition system in accordance with aspects of the present disclosure.

FIG. 5 illustrates a flow diagram for determining attributes by a facial recognition system (e.g. facial recognition system 105) in accordance with aspects of the present disclosure. The attributes can be determined by an analysis module 153 of the facial recognition system, which can be the same as that previously discussed herein. At step 503, the analysis module 153 can detect an individual's face in an image, as previously described herein. The detected face can be associated with a pose. At step 505, the analysis module 153 can determine fiducial points in the face detected at step 503, as previously described herein. At step 507, the analysis module 153 can determine 2D patches from within the face based on the fiducial points determined at step 505.

Further, at step 509, the analysis module 153 can classify attributes of the face detected in step 503 (e.g., pose) and in the 2D patches determined at step 507. For example, based on the face and the 2D patches, the analysis module 153 uses a linear classifier that associates the semantics, "male," "Caucasian," "pointy nose," and "glasses" with the image. Each of the semantics may have an associated weight of the respective semantic corresponding to a certainty of the determination. For example, a weight associated with the semantic "male" is greater when the analysis module 153 determines that the gender of the individual in the image is certainly a male, and the weight can be lower when the analysis module 153 determines that the gender of the individual in the image is not clearly a male. In embodiments, the certainty can be determined based on a similarity determined by comparison of fiducial points in the images and reference data (e.g., in domain knowledge database 137).

In embodiments, the analysis module 153 determines the attributes using a convolutional neural net (CNN) that identifies pose-specific PEP representation corresponding to a range yaw and pitch values of a head pose. By decomposing the image into the 2D patches in step 507 based on parts that are pose-specific, the subsequent training of convolutional neural net is substantially easier. Accordingly, the analysis module 153 can determine pose-normalized features from relatively small datasets. In addition to low-level features, the image patches used for establishing correspondence (or matching) between a pair of representations depend on the 3D pose (yaw and pitch), and can be learned independently for each 3D pose using the convolutional neural net. Further, the analysis module 153 may use a model that augments deep convolutional networks to have input layers based on semantically aligned part patches. This model learns features that are specific to a certain attribute under a certain pose. The analysis module 153 can then combine the attributes produced by such networks and construct a pose-normalized deep representation. The analysis module integrates deep learning architecture in the multi-view PEP based representation which is trained to support media with varied resolution, quality and conditions (e.g., age, pose, illumination).

Figure 6:
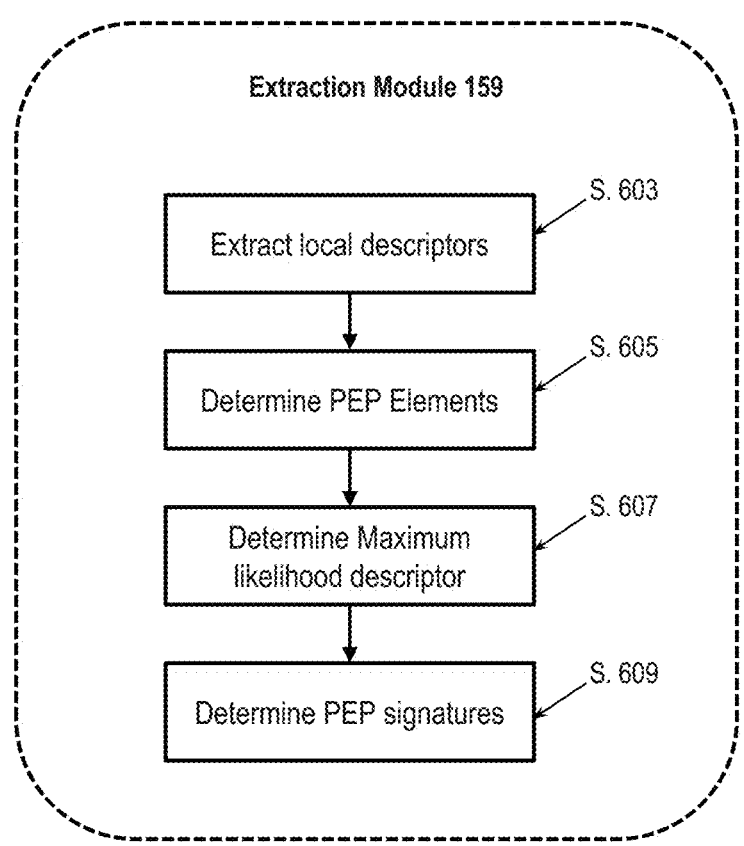
FIG. 6 illustrates a flow diagram of an exemplary process for determining multi-view PEP signature using a facial recognition system in accordance with aspects of the present disclosure.

FIG. 6 illustrates a flow diagram for a process performed by a facial recognition system (e.g. facial recognition system 105) for determining multi-view PEP signature in accordance with aspects of the present disclosure. The attributes can be determined by extraction module 159, which can be the same as that those previously discussed herein.

At step 603, the extraction module 159 extracting local descriptors from a 3D model, which may be the same as previously described. At step 605, the extraction module 159 determines components of a PEP model. In accordance with aspects of the invention, the training images (e.g. in image database 136), the modeling module 155 extracts spatial appearance local descriptors using a Gaussian mixture model constraining the Gaussian components to be spherical. The extraction module 159 can determine parameters using Expectation-Maximization (EM). The PEP model effectively handles pose variations based on a part based representation, and handles variations from other factors using invariant local descriptors.

At step 607, the extraction module 159 determines a maximum likelihood part descriptors from among the components of the PEP model determined in step 605. For example, each Gaussian component (representing a face part) of the determined PEP model selects the local image descriptor with highest likelihood for that component arose from the parameters of the model.

At step 609, the extraction module 159 determines a PEP signature from the maximum likelihood part descriptors determined at step 607. To determine a final representation, extraction module 159 can concatenate the selected descriptors from all components. To handle real-world conditions, extraction module 159 extends the PEP model described above into Pose-aware PEP Model, whereby the modeling module 155 discretize the yaw-pitch pose space into different pose bins and obtain a different PEP model and representation for each. The ensemble of all the PEP models leads to an ensemble PEP representation that can more effectively model a larger range of pose variations. The extraction module 159 metric learning for each individual PEP representation in the ensemble and naturally adopt the generative probability of the input face images with respect to each individual PEP model to adaptively weight the metrics defined upon each individual PEP representations.

With every additional face image of a subject, the extraction module 159 aggregates the part descriptors adopting soft-max aggregation. By obtaining a weighted sum of all the maximum likelihood part descriptors from all face images, where the weight of each maximum likelihood part descriptor is set by a multinomial soft-max function using the probability of the descriptor associated with the corresponding part, PEP model enables incremental and reversible updates of descriptors. Simultaneously recording the probability of each maximum likelihood part descriptor, enables flexibly updating an existing representation by either adding the maximum likelihood descriptor from additional new images, or removing the maximum likelihood descriptor from a subset of existing images which have been used to produce the existing representation, without the need to access all the original images. Further, soft-max aggregation based updates allow the Pose-aware PEP representation to be fixed in size.

In accordance with aspects of the invention, pose-aware PEP based 2D representations will be a three part representation, with each for imagery from visible spectrum, from near infrared spectrum and for composite sketches (or cartoons). For each type of representation, extraction module 159 estimates an uncertainty metric, which associated with the signature derived from the patch based on generative probabilities. Such uncertainty metric can assist in accurately matching signatures with individuals.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the present disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    determining a three-dimensional (3D) model of a face of an individual based on a plurality of different images of the individual;
    extracting two-dimensional (2D) patches from the 3D model; and
    generating a plurality of signatures of the face using different combinations of the 2D patches, wherein the plurality of signatures correspond to respective views of the 3D model from different angles;
    determining a plurality of attributes of the individual that semantically describe characteristics of the individual; and
    indexing the plurality of signatures based on the plurality of attributes.

2. The method of claim 1, wherein the determining the 3D model comprises:
    identifying elements of the 3D model lacking information from the plurality of images; and
    providing the information for the identified elements using domain knowledge compiled from individuals having attributes similar to those of the individual.

3. The method of claim 1, further comprising modifying the 3D model by normalizing lighting variations in the 3D model.

4. The method of claim 1, further comprising neutralizing a facial expression resulting from the plurality of different images of the individual.

5. The method of claim 1, further comprising modifying the 3D model based on an age of the individual.

6. The method of claim 1, further comprising determining respective uncertainty values for the plurality of signatures, wherein the uncertainty values are based on a quality of respective 2D patches included in the plurality of signatures.

7. The method of claim 1, further comprising determining that a face image matches at least one of the plurality of signatures.

8. The method of claim 7, wherein the determining that the face image matches comprises modifying a resolution of the plurality of signatures based on a resolution of the face image.

9. The method of claim 7, wherein the determining that the face image matches comprises matching using a plurality imaging modalities.

10. The method of claim 1, wherein the plurality of signatures of the face are iteratively refined using a number of additional face images of the individual.

11. The method of claim 10, wherein the plurality of signatures of the face has a fixed size irrespective of the number of additional face images.

12. The method of claim 1, further comprising:
determining uncertainty metrics corresponding, respectively, to the plurality of signatures;
associating the plurality of signatures with the corresponding uncertainty metrics.

13. The method of claim 1, further comprising determining which of the plurality of signatures corresponds to a portion of the face having a greatest number of discriminative features.

14. A facial recognition system comprising:
a processor;
a storage system;
program instructions stored on a computer readable hardware storage device for execution by the processor, the program instructions comprising:
program instructions that determine a three-dimensional (3D) model of a face of an individual based on a plurality of different images of the individual;
program instructions that extract two-dimensional (2D) patches from the 3D model; and
program instructions that generate a plurality of signatures of the face using different combinations of the 2D patches, wherein the plurality of signatures correspond to respective views of the 3D model from different angles;
determining a plurality of attributes of the individual that semantically describe characteristics of the individual; and
indexing the plurality of signatures based on the plurality of attributes.

15. The system of claim 14, wherein the determining the 3D model comprises:
identifying elements of the 3D model lacking information from the plurality of images; and
providing the information for the identified elements using domain knowledge compiled from individuals having attributes similar to those of the individual.

16. The system of claim 14, further comprising modifying the 3D model by normalizing lighting variations in the 3D model.

17. The system of claim 14, further comprising normalizing a facial expression resulting from the plurality of different images of the individual.

18. The system of claim 14, further comprising modifying the 3D model based on an age of the individual.

19. The system of claim 14, further comprising determining respective uncertainty values for the plurality of signatures, wherein the uncertainty values are based on a quality of respective 2D patches included in the plurality of signatures.

20. The system of claim 14, further comprising determining that a face image matches at least one of the plurality of signatures.

21. The system of claim 20, wherein the determining that the face image matches comprises modifying a resolution of the plurality of signatures based on a resolution of the face image.

22. The system of claim 20, wherein the determining that the face image matches comprises matching using a plurality imaging modalities.

23. The system of claim 14, wherein the plurality of signatures of the face are iteratively refined using a number of additional face images of the individual.

24. The system of claim 14, wherein the plurality of signatures of the face has a fixed size irrespective of the number of additional face images.

25. The system of claim 14, further comprising:
determining uncertainty metrics corresponding, respectively, to the plurality of signatures;
associating the plurality of signatures with the corresponding uncertainty metrics.

26. The system of claim 14, further comprising determining which of the plurality of signatures corresponds to a portion of the face having a greatest number of discriminative features.

* * * * *